(12) United States Patent
Venturi

(10) Patent No.: US 9,788,683 B2
(45) Date of Patent: Oct. 17, 2017

(54) INFUSION DEVICE FOR MAKING BEVERAGES USING CARTRIDGES, SUCH AS CAPSULES OR PODS

(71) Applicant: CAFFITALY SYSTEM S.p.A., Gaggio Montano-Bologna (IT)

(72) Inventor: Roberto Degli Esposti Venturi, Bologna (IT)

(73) Assignee: Caffitaly System S.p.A., Gaggio Montano (Bologna) (IT)

(*) Notice: Subject to any disclaimer, the term of this patent is extended or adjusted under 35 U.S.C. 154(b) by 578 days.

(21) Appl. No.: 14/345,431

(22) PCT Filed: Sep. 18, 2012

(86) PCT No.: PCT/IB2012/054944
§ 371 (c)(1),
(2) Date: Mar. 18, 2014

(87) PCT Pub. No.: WO2013/042042
PCT Pub. Date: Mar. 28, 2013

(65) Prior Publication Data
US 2014/0238246 A1    Aug. 28, 2014

(30) Foreign Application Priority Data
Sep. 19, 2011    (IT) .............................. VR2011A0179

(51) Int. Cl.
*A47J 31/40*    (2006.01)
*A47J 31/36*    (2006.01)
(Continued)

(52) U.S. Cl.
CPC ........... *A47J 31/407* (2013.01); *A47J 31/002* (2013.01); *A47J 31/3633* (2013.01); *A47J 31/58* (2013.01)

(58) Field of Classification Search
CPC ............. A47J 31/40; A47J 31/44; A47J 31/00
(Continued)

(56) References Cited

U.S. PATENT DOCUMENTS 5,158,793 A * 10/1992 Helbling ............... A47J 31/007
426/231
6,240,832 B1 * 6/2001 Schmed ............. A47J 31/3623
221/121
(Continued)

FOREIGN PATENT DOCUMENTS

FR        2745995 A1      9/1997
FR    EP 1935298 A1 *    6/2008 .......... A47J 31/3633
(Continued)

OTHER PUBLICATIONS

International Search Report corresponding to application No. PCT/IB2012/054944, dated Dec. 19, 2012, (2 pages).
(Continued)

*Primary Examiner* — Quang D Thanh
*Assistant Examiner* — Ayub Maye
(74) *Attorney, Agent, or Firm* — Maginot, Moore & Beck, LLP

(57) ABSTRACT

An infusion device for making beverages using cartridges, such as capsules or pods, containing at least one food substance, comprising an infusion unit (3) comprising at least two parts, at least one of which is able to move between a home position and an operating position, at least one insertion section (34) for inserting the cartridge (2) in the device (1), from which the cartridge (2) can then be fed to a first standby zone (8), at least one check and control unit (35) for device (1) operation, and second retaining means (36) positioned between the insertion section (34) and the first standby zone (8), the second retaining means in turn being able to move between a first position in which they can
(Continued)

retain a cartridge (2) and a second position in which they allow the cartridge (2) to advance, the second retaining means (36) being able to move as one with the mobile part (4) and comprising at least one mobile element (38) removably coupled to the mobile part (4) of the unit (3), and means for uncoupling the mobile element (38) from the mobile part (4) when, during movement of the mobile part (4), the mobile element (38) opposes said movement with a force which is greater than a predetermined maximum force.

19 Claims, 12 Drawing Sheets

(51) Int. Cl.
*A47J 31/00* (2006.01)
*A47J 31/58* (2006.01)

(58) Field of Classification Search
USPC .......................................... 99/280, 283, 295
See application file for complete search history.

(56) References Cited

U.S. PATENT DOCUMENTS

| | | | |
|---|---|---|---|
| 7,856,919 B2* | 12/2010 | Van Belleghem | A47J 31/0642 99/280 |
| 9,186,018 B2* | 11/2015 | Rotta | A47J 31/3628 |
| 2011/0111107 A1* | 5/2011 | Rahn | A47J 31/368 426/425 |
| 2011/0162531 A1* | 7/2011 | Lang | A47J 31/3623 99/285 |
| 2013/0114089 A1* | 5/2013 | Jarisch | A47J 31/0668 356/614 |
| 2013/0129872 A1* | 5/2013 | Kruger | A47J 31/4492 426/115 |
| 2013/0152797 A1* | 6/2013 | Mori | A47J 31/3604 99/280 |
| 2013/0312619 A1* | 11/2013 | Spiegel | A47J 31/3623 99/295 |

FOREIGN PATENT DOCUMENTS

| | | |
|---|---|---|
| FR | 2916336 A1 | 11/2008 |
| WO | 2012123440 A1 | 9/2012 |

OTHER PUBLICATIONS

English language human translation of EP 1 935 298 A1, translation completed at least by Feb. 7, 2017 (20 pages).

* cited by examiner

INFUSION DEVICE FOR MAKING BEVERAGES USING CARTRIDGES, SUCH AS CAPSULES OR PODS

This invention relates to an infusion device for making beverages using cartridges, such as capsules or pods. In particular this invention is intended for the coffee maker machine sector.

In more detail, this invention relates exclusively to extraction devices equipped with a motor-controlled openable infusion unit. In contrast, this invention does not relate to extraction devices with manual opening and closing of the unit.

Examples of prior art infusion devices which may comprise motor-driven operation of the infusion unit are described in patents EP 1 757 212, EP 1 721 553, EP 1 781 153, EP 2 046 170 and EP 2 037 781.

According to the prior art, motor-driven units are controlled by a check and control unit which is also connected to an interface (consisting of buttons, touch screen display, etc.) with which the user can set up device operation.

In particular, when the operator wants to make a beverage, he presses a first button and the control unit issues the command to open the unit. The user then inserts the cartridge and presses a second button to close the unit. The beverage may then be dispensed automatically, or a specific button may have to be pressed.

When the user must make two beverages one after another, he performs the same operation twice. That also applies when the beverage to be made requires the use of two cartridges, as in the case of a cappuccino (which requires the use of one cartridge containing the coffee and one containing the milk).

Therefore, in the case of motor-driven units, the various machine control operations may be relatively complex and even less intuitive than in manually operated units where the user is more aware of the effect of his actions than when using simple push-button controls. Consequently, users may more often make errors when using automatic machines.

Patents FR 2 916 336 and FR 2 745 995 are also known, for devices able to retain a cartridge in a second standby position which is different from that adopted by the cartridge at the moment of use. However, these devices are not able to correctly manage any incorrect positioning of the cartridges at the moment the unit is closed.

In this situation the technical purpose which forms the basis of this invention is to provide an infusion device for making beverages using cartridges, such as capsules or pods, which overcomes the above-mentioned disadvantages. In particular, the technical purpose of this invention is to provide an infusion device for making beverages using cartridges, such as capsules or pods, which allows the best possible management of any cartridge positioning errors in the device itself.

The technical purpose specified and the aims indicated are substantially achieved by an infusion device for making beverages using cartridges, such as capsules or pods, as described in the appended claims.

Further features and the advantages of this invention are more apparent in the detailed description, with reference to the accompanying drawings which illustrate several preferred, non-limiting embodiments of an infusion device for making beverages using cartridges, such as capsules or pods, in which.

Figure 1:
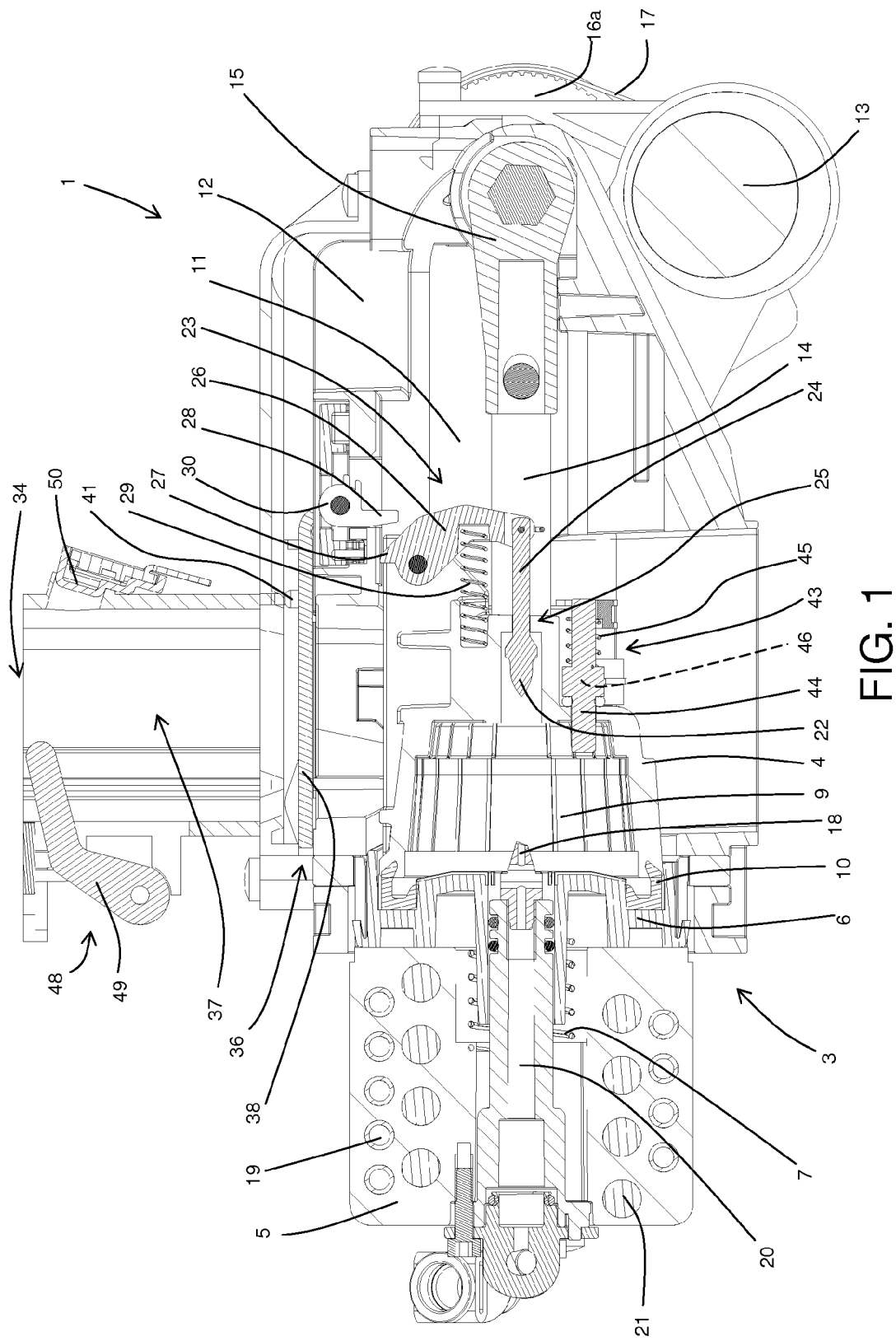
FIG. 1 is a schematic longitudinal vertical section of an extraction device made in accordance with this invention, with the unit closed but no cartridges present.

With reference to the accompanying drawings the numeral 1 denotes in its entirety an infusion device for making beverages using cartridges 2 made in accordance with this invention. In the context of this invention, the term cartridge 2 refers to any type of wrapper or case containing a food substance. In particular, the most common types of cartridges 2 are capsules and pods, whether fully sealed (as in the case illustrated) or not.

In the embodiment illustrated, the infusion device 1 is a device 1 with horizontal unit. However, if technically applicable, this invention may also be applied to other types of extraction devices, as those with non-horizontal units.

In general, the device 1 made according to this invention comprises first an infusion unit 3 which in turn comprises at least two parts. In particular, in the preferred embodiment, the infusion unit 3 comprises a mobile part 4 and a substantially fixed contact part 5. However, in other embodiments, both of said parts may be mobile. However, in more detail, even the fixed contact part 5 advantageously comprises a mobile portion intended to be coupled to the mobile part 4. The mobile portion comprises a plate 6 which, under the action of the mobile part 4, can be moved from its own standby position to its own infusion position, overcoming the action of an opposing spring 7. The main aim of the plate 6 is to facilitate cartridge 2 expulsion during unit 3 reopening.

The mobile part 4 (whether one or more) can move between a home position and an operating position. When the mobile part 4 is in the home position it is distanced from the other part and there is a first standby zone 8 for a cartridge 2 to be used; in the case of a horizontal unit as in the embodiment illustrated in the accompanying drawings, the first standby zone 8 is formed between the two parts 4, 5 of the unit 3; however, in other embodiments, the first standby zone 8 may also be formed directly by one of the two parts 4, 5 of the unit 3. In contrast, when it is in the operating position, the mobile part 4 is coupled to the other part and together with it forms a housing 9 for the cartridge 2. In the embodiment illustrated, in particular, the housing 9 is mainly formed by the mobile part 4, whilst the contact part 5 substantially acts as a lid closing the housing 9. In more detail, when the mobile part 4 is in the operating position the housing 9 is closed by the plate 6 which is in its own infusion position. Mounted on the plate 6 there is also a seal 10 which guarantees sealing once the housing 9 has been closed. However, in other embodiments, there may also be different solutions.

In the embodiment not illustrated in which the first standby zone 8 is made in one of the parts 4, 5 of the unit 3, advantageously the first standby zone 8 is the portion of the housing 9 formed by one of the two parts 4, 5 of the unit 3.

Moreover, in the embodiment illustrated, the movement of the mobile part 4 from the home position to the operating position and vice versa occurs along a horizontal movement trajectory, and, in the known way, the mobile part 4 is shaped in such a way that it receives the cartridge 2 during its movement from the home position to the operating position.

Advantageously, the movement trajectory of the mobile part 4 is determined by two horizontal slots 11, each made in a lateral supporting shoulder 12 of the unit 3. In fact, the mobile part 4 is advantageously slidably inserted in said slots 11 by means of lateral projecting protrusions, not illustrated. However, depending on the embodiments, the movement trajectory may also be obtained in any other way suitable for the purpose.

The movement of the mobile part 4 is driven by a motor 13 which is operatively connected to it. In the embodiment illustrated, in particular, the motor 13 is connected to the mobile part 4 by motion transmission means which comprise a connecting rod 14 at one end pivoting at the mobile part 4 and at the other end pivoting at a first end of a crank 15 whose second end is fixed to a first pulley 16*a* which is in turn connected to a second pulley 16*b*, fixed to the motor 13 shaft 13*a*, by means of a driving belt 17. However, obviously, the motor 13 may be connected to the mobile part 4 in any other way.

The device 1 comprises means for preparing the beverage which are operatively associated with the housing 9, for injecting water into a cartridge 2 contained in it and for collecting the beverage prepared. In the embodiment illustrated, the preparation means are in particular associated with the fixed part 5 as regards water injection, and with the mobile part 4 as regards collection of the beverage.

Figure 6:
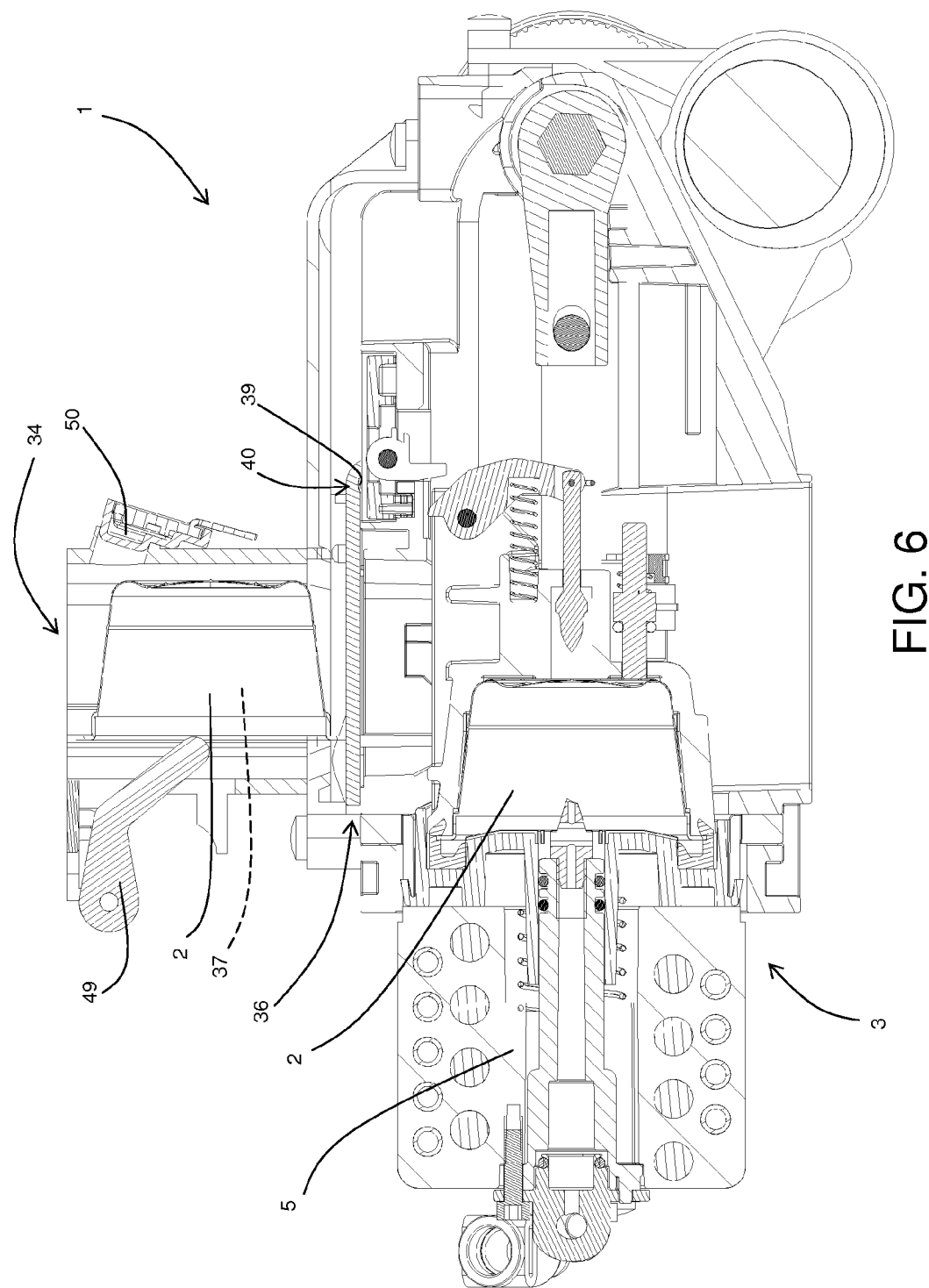
FIG. 6 is a schematic view of the device of FIG. 5 after insertion of a second cartridge at a second standby zone.

In more detail, in the embodiment illustrated (in which the device 1 is intended to use cartridges 2 consisting of sealed capsules), the preparation means comprise a first hollow piercing spike 18 fixed to the fixed part 5 and which, when the unit 3 is closed, projects into the housing 9 through the mobile plate 6. The first spike 18 is designed to pierce an upper part of a cartridge 2 (FIG. 6) and to inject the hot infusion water into it. For this reason, the first spike 18 is in fluid connection with a feed pipe which can be connected to a pump and to a tank (which are of the known type and therefore not illustrated). In the part illustrated in the accompanying drawings the feed pipe, in particular, comprises a first, upstream stretch 19 which has the shape of a spiral and a second, downstream stretch 20 which is axially aligned with the first piercing spike 18. The first, spiral stretch 19 is embedded in the body of the fixed part 5 in which an electric heating element 21 is also embedded, the latter also advantageously having the shape of a spiral.

To allow collection of the beverage, the preparation means comprise a second piercing spike 22 intended to pierce the bottom of the cartridge 2 to allow the beverage to come out. A drain, of the known type and therefore not illustrated, then allows the beverage out of the device 1.

In the preferred embodiment illustrated in the accompanying drawings, the second piercing spike 22 is blade-shaped and can move between a cutting position in which it projects into the housing 9 and a non-interference position in which it does not interfere with a cartridge 2 inserted in the housing 9. Moreover, advantageously, it is associated with activation means 23 which cause it to move rapidly from the non-interference position to the cutting position and again to the non-interference position during the unit 3 closing step (that is to say, as the mobile part 4 passes from the home position to the operating position).

In the embodiment illustrated, the activation means 23 comprise a first rod 24 slidably inserted in a (horizontal) guide channel 25, and which at one end forms the second piercing spike 22 and at the other end is connected to one end of a second rod 26 whose other end in turn pivots at the mobile part 4. The second rod 26 comprises a first engagement tooth 27 shaped in such a way that it engages with a second engagement tooth 28 which is stationary relative to the mobile part 4, during the movement of the mobile part 4 from the home position to the operating position. The action of the second tooth 28 on the first tooth 27 causes a rotation of the second rod 26 which in turn causes sliding of the first rod 24 until the second piercing spike 22 is in the housing 9. The subsequent further advancing of the mobile part 4 towards the operating portion then causes the first tooth 27 to disengage from the second tooth 28. At that point the first tooth 27 is returned to the starting position by a first return spring 29. Finally, the second tooth 28 is in turn made on a first elastic return rotary unit 30 which allows its rotation (anti-clockwise in the accompanying drawings) when the mobile part 4 returns to the home position and the first tooth 27 strikes it on the opposite side to the side it engages with during unit 3 closing.

In the embodiment illustrated, where unit 3 is a horizontal unit, the device 1 advantageously also comprises first retaining means for a cartridge 2 in the first standby zone 8, designed to retain the cartridge 2 in position for subsequent unit 3 closing and its insertion in the housing 9.

Examples of retaining means which can be used in the context of this invention are described in patents EP 1 757 212, EP 1 721 553, EP 1 781 153, EP 2 046 170 and EP 2 037 781 whose content is referred to herein in its entirety. In the embodiment illustrated, in particular, the retaining means comprise two arms 31 which are positioned on either side of the first standby zone 8, each arm comprising a groove 32 in which an upper flange of the cartridge can be inserted (in the accompanying drawings obviously only one of the arms 31 is visible). The two arms 31 can be spread apart after the action of the mobile part 4 with angled surfaces 33 fixed to them, during the passage from the home position to the operating position. However, since these are known aspects, they are not described in further detail herein.

In contrast, in the embodiment not illustrated in which the first standby zone 8 is made in one of the parts 4, 5 of the unit 3, the retaining means will be formed by the respective part 4, 5 of the unit 3.

Figure 7:
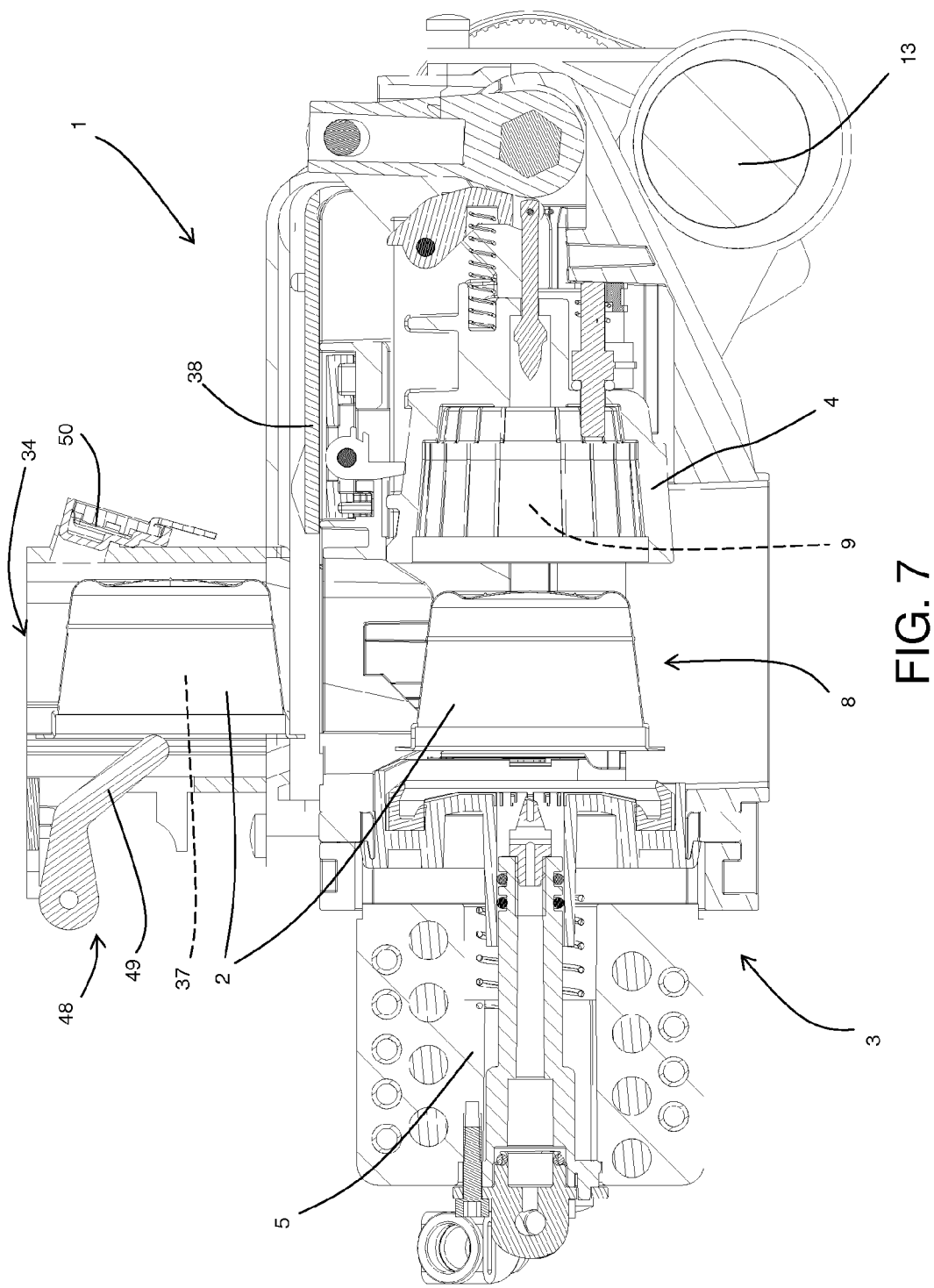
FIG. 7 is a schematic view of the device of FIG. 6 with the unit just reopened.
Figure 8:
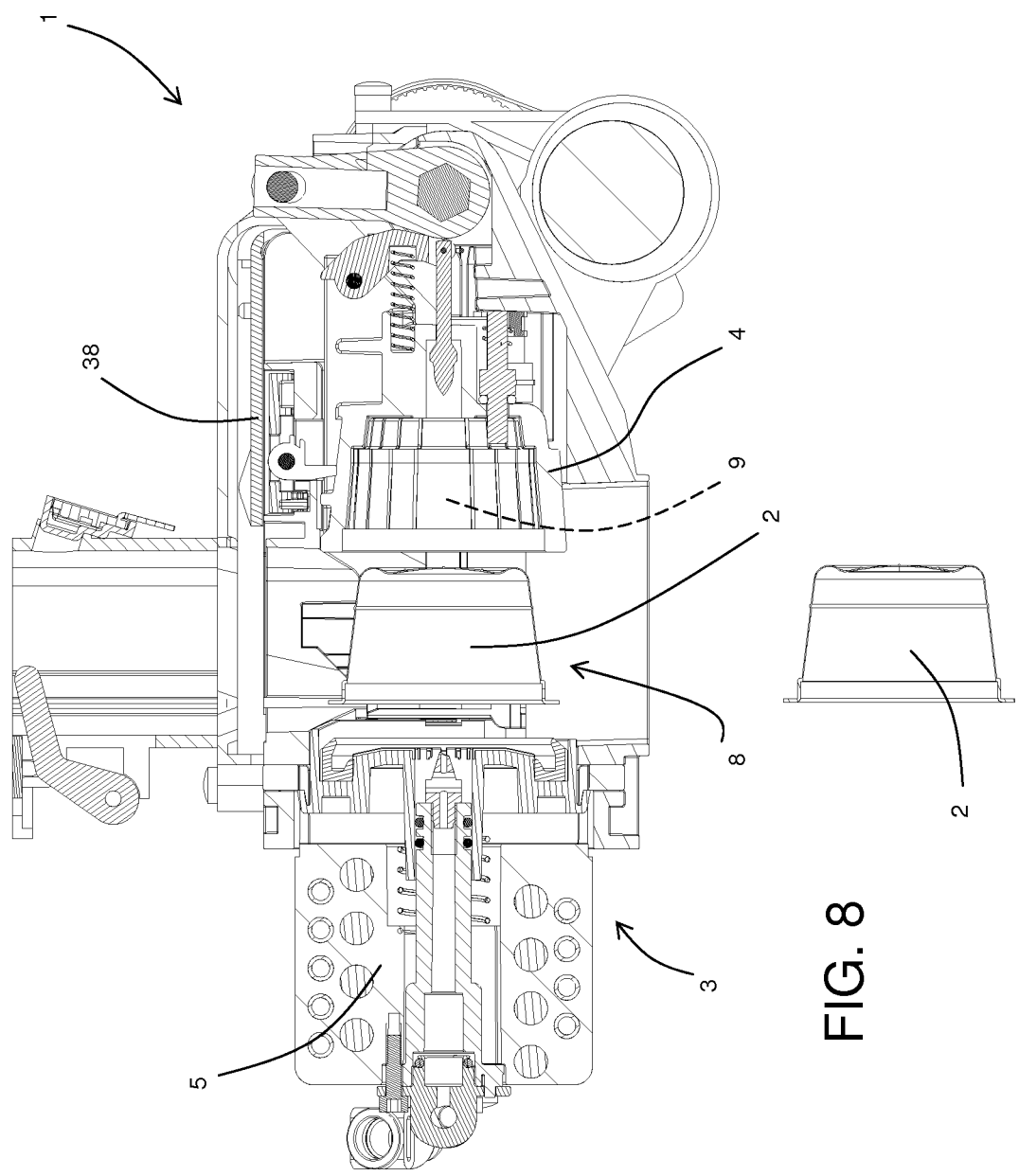
FIG. 8 is a schematic view of the device of FIG. 8 with the first cartridge expelled and the second cartridge descended into the first standby zone.

Advantageously, the device 1 comprises means for expelling the cartridge 2 from the unit 3, when the mobile part 4 returns from the operating position to the home position, which in the preferred embodiment are formed by the first retaining means. In fact the latter are advantageously shaped in such a way that they engage with the upper flange of the cartridge 2 when the unit 3 opens, preventing the flange from being able to return to the grooves. Consequently, as the unit 3 gradually opens the cartridge 2 is extracted from the housing 9 until, completely freed (FIG. 7), it can drop down (FIG. 8).

There is also at least one insertion section 34 for inserting the cartridge 2 in the device 1, from which the cartridge 2 can then be fed to the first standby zone 8. In the preferred embodiment, in particular, the cartridge 2 passage from the insertion section 34 to the first standby zone 8 occurs simply by gravity.

The entire operation of the device 1 is checked and controlled by at least one check and control unit 35 which is operatively connected at least to the motor 13 for controlling the movement of the mobile part 4 between the home position and the operating position, and to the preparation means for activating and deactivating water injection. Advantageously, the check and control unit 35 is connected to an interface (not illustrated) with which the user can control device 1 activation and if necessary can set the device operating parameters.

With reference to the most innovative aspects of this invention, first it should be noticed that, as described in more detail below, within the scope of this invention various different embodiments were developed which may be implemented either together in the same infusion device 1, or independently of one another.

Therefore, for the sake of simplicity, hereinafter the various embodiments will be described separately, presenting first an embodiment which allows simplification of the operations for making two beverages and in the context of this first embodiment another which allows use of the device 1 to be made safer, then an embodiment which allows a reduction in the possibility of user errors, and finally an embodiment which allows simplification of the operations for inserting cartridges 2 in the device 1.

With reference to the first embodiment of this invention, the device 1 also comprises firstly a second standby zone 37 in which a second cartridge 2 can be held during extraction of a first cartridge 2 and second retaining means 36 which are positioned between the insertion section 34 and the first standby zone 8 so as to allow retaining of the second cartridge 2 standing by in the second standby zone 37, at least while a first beverage is being made using a first cartridge 2 inserted in the housing 9.

Depending on the embodiments, the second retaining means may be formed by the mobile part 4 or they may be separate from it, as in the preferred embodiment illustrated in the accompanying drawings. In the former case (not illustrated), when the unit is open retaining of the second cartridge 2 in the second standby zone 37 can be guaranteed by the first cartridge 2 inserted in the first standby zone 8 (the second cartridge 2 can rest on the first cartridge 2), whilst when the unit is closed and the mobile part 4 is in the operating position the second capsule 2 is supported by the latter. In fact, during the unit closing step, the mobile part 4 is inserted between the two cartridges 2 separating them.

Figure 2:
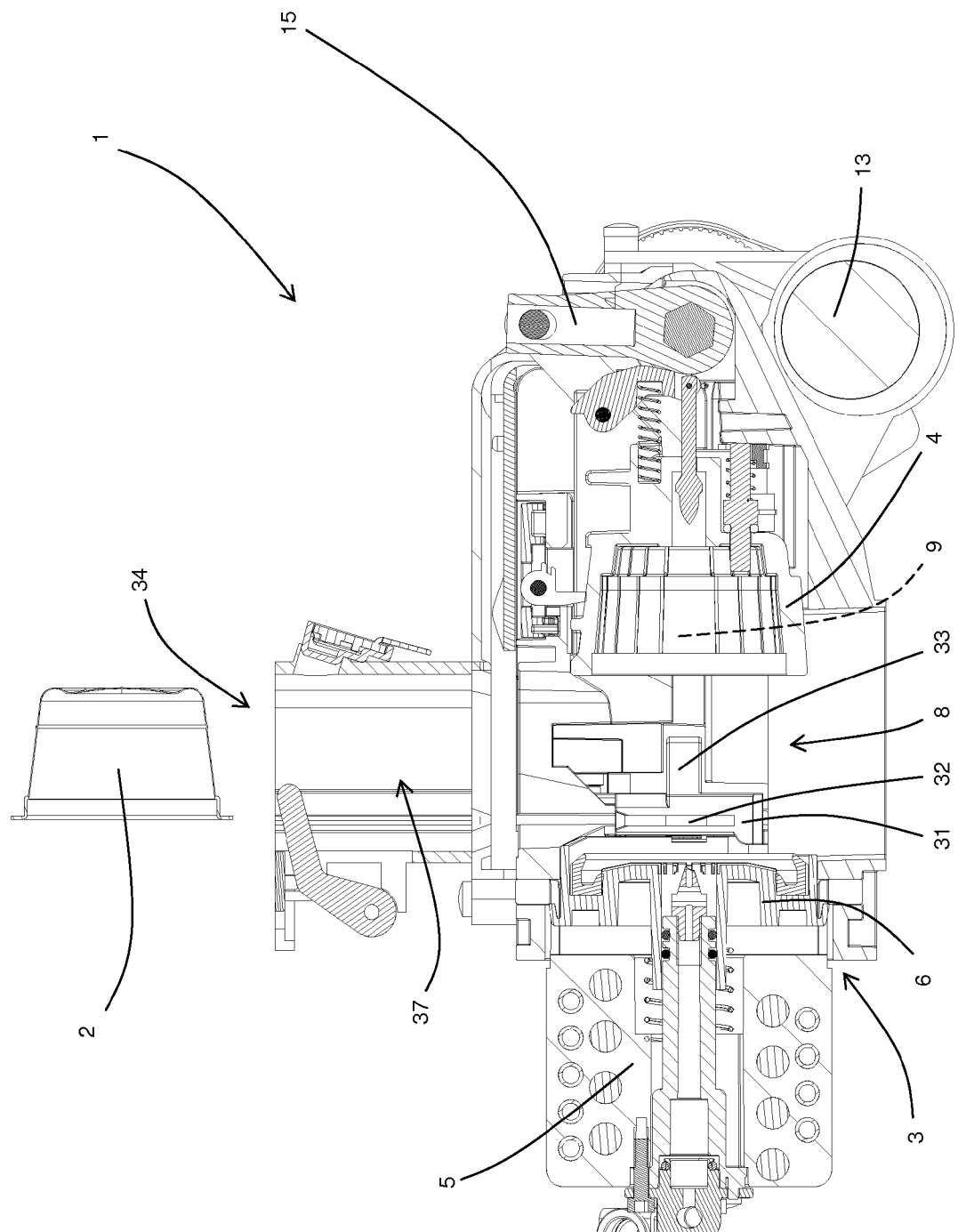
FIG. 2 is a schematic view of the device of FIG. 1 with the unit open and a cartridge ready to be inserted.
Figure 3:
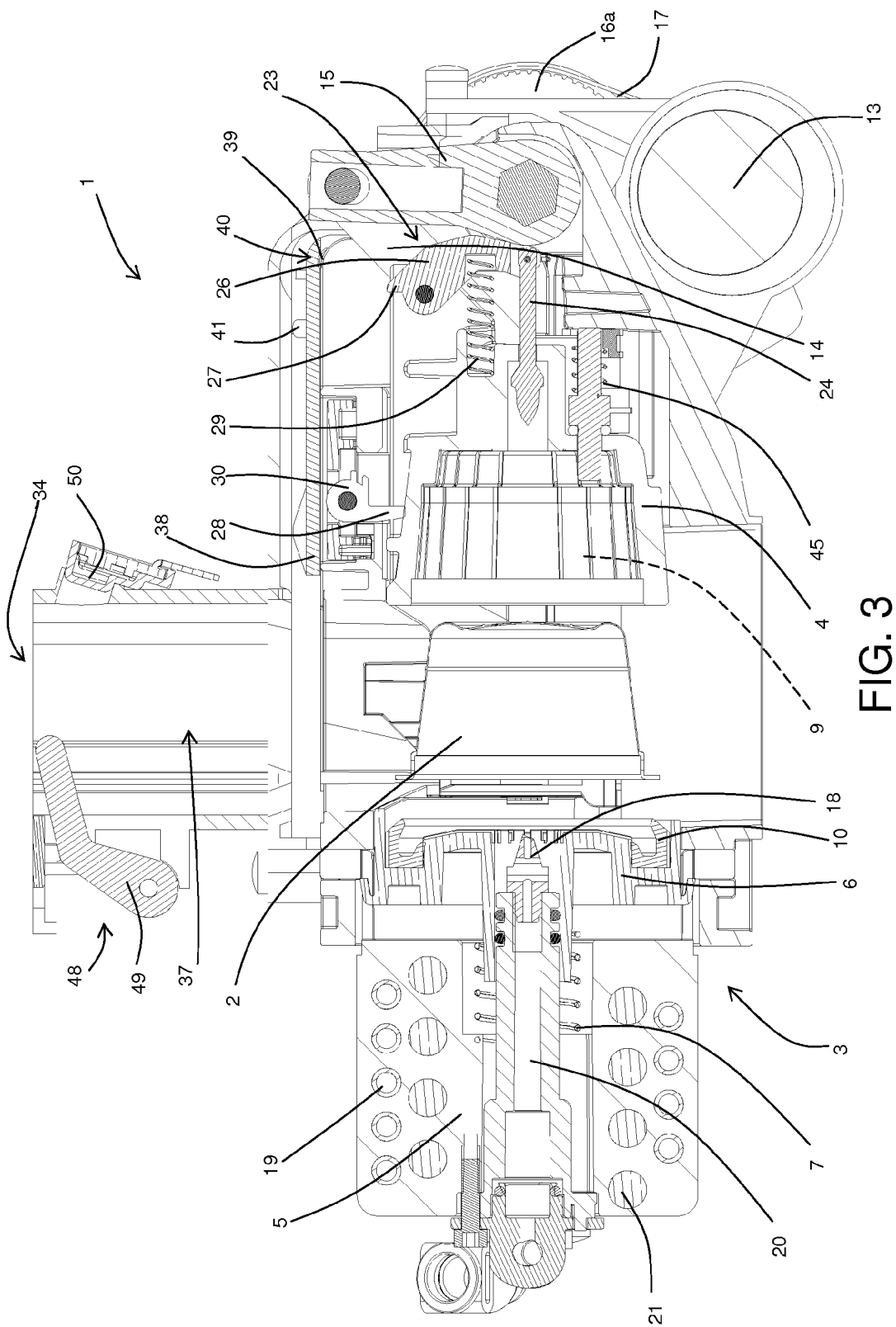
FIG. 3 is a schematic view of the device of FIG. 1 with the cartridge inserted in a first standby zone.
Figure 4:
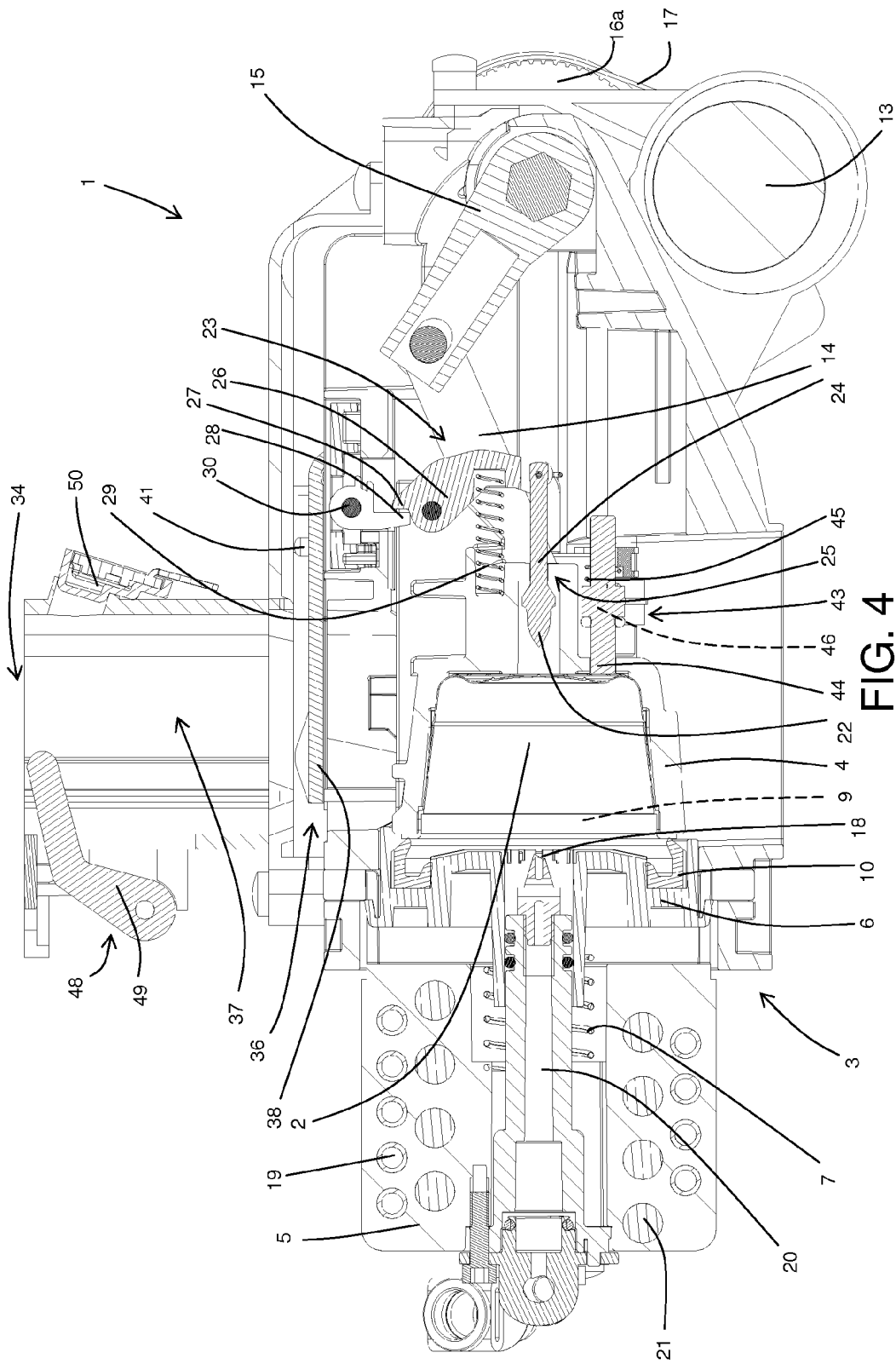
FIG. 4 is a schematic view of the device of FIG. 3 during unit reclosing.
Figure 5:
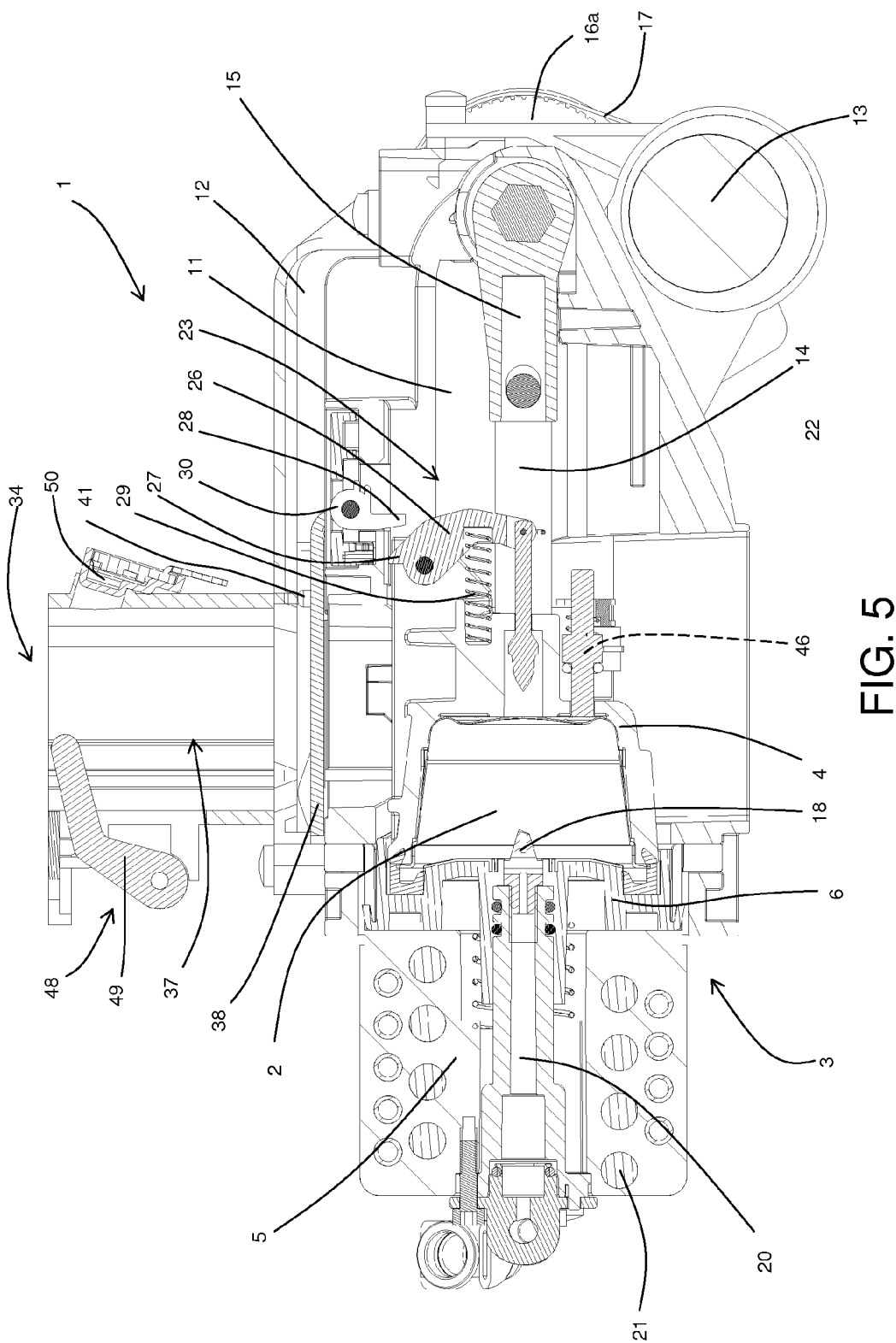
FIG. 5 is a schematic view of the device of FIG. 4 with the unit closed.

In general, the second retaining means 36 are in turn able to move between a first position in which they can retain a cartridge 2 at the second standby zone 37 (FIG. 6) and a second position in which they allow the cartridge 2 to advance towards the first standby zone 8 (FIG. 2). To guarantee the movement of the second retaining means between the first position and the second position, the device also comprises means, at least in part motor-driven, for moving the second retaining means between the first and second positions. Moreover, advantageously, the check and control unit 35 is operatively connected to the movement means for moving the second retaining means 36 between their two positions.

When the second retaining means 36 are formed by the mobile part 4, the movement means are those already described which cause the movement of the mobile part 4 (motor 13, connecting rod 14, etc.). However, it should be noticed that said indication is intended to also cover embodiments in which the movement of the second retaining means 36 is obtained indirectly by moving other parts of the device 1 which then cause the movement of the second retaining means 36 (the set of all of the various parts involved constituting the movement means). That is precisely what happens for example in the embodiment shown in FIGS. 1 to 9 where the movement of the second retaining means 36 is in any case caused by the mobile part 4. In fact, in the preferred embodiment, the second retaining means 36, although separate from the mobile part 4, are able to move with the mobile part at least during normal operation, and are in the first position when the mobile part 4 is in the operating position, and in the second position when the mobile part 4 is in the home position (similarly to what happens in cases in which the retaining means are formed by the mobile part 4).

In more detail, in the embodiment illustrated and relating to the second inventive aspect of this invention (which may even be implemented independently of the first inventive aspect described), the second retaining means 36 comprise at least one mobile element 38 which is coupled to the mobile part 4 of the unit 3, and which is a kind of horizontal gate which can intercept the path of the cartridge 2 from the insertion section 34 to the first standby zone 8.

Figure 12:
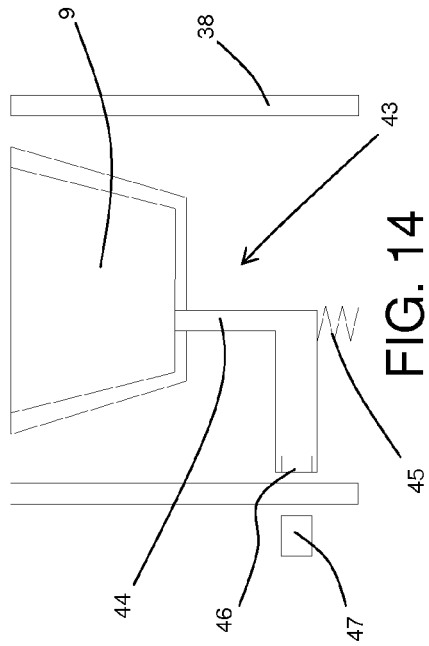
FIG. 12 shows the detail of FIG. 11 in a malfunctioning operating condition.
Figure 18:
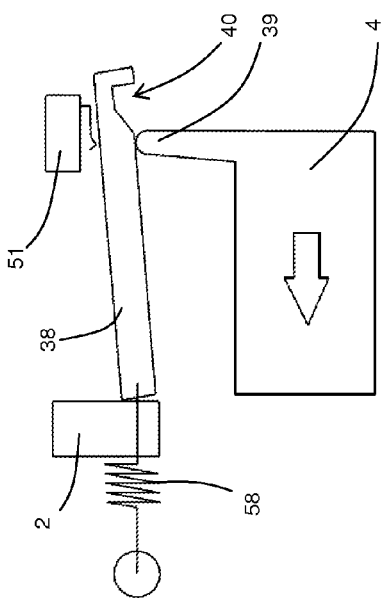
FIG. 18 illustrates the detail of FIG. 17 in a malfunctioning operating condition.

The mobile element 38 is advantageously removably coupled to the mobile part 4. In particular, there are means for uncoupling the mobile element 38 from the mobile part 4 when, during movement of the mobile part 4, the mobile element 38 opposes said movement with a force which is greater than a predetermined maximum force. That situation may arise for example if, during unit 3 closing, something (for example a cartridge 2 which is jammed as in FIGS. 12, 16 and 18) intercepts the trajectory of the mobile element 38, preventing its movement despite the thrust applied by the motor 13.

Figure 11:
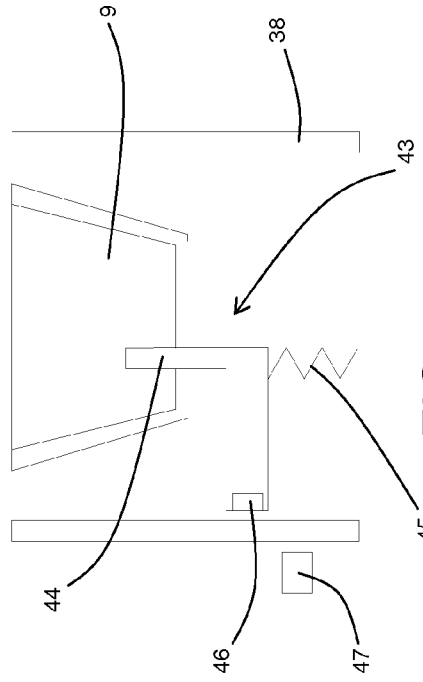
FIG. 11 is a schematic view of a first detail of the machine of the preceding figures in a normal operating condition.

For that purpose, the coupling between the mobile element 38 and the mobile part 4 may be obtained by means of at least one raised element 39 and at least one recess 40 which is coupled to the raised element 39, the raised element and the recess being fixed one to the mobile part 4 and the other to the mobile element 38 (FIG. 11). In fact, advantageously, the recess 40 and/or the raised element 39 (both in the accompanying drawings) extend transversally to the direction of movement (vertically in the accompanying drawings) and are shaped in such a way that a force applied between the mobile part 4 and the mobile element 38 in the direction of movement generates a component of force on the mobile element 38 which is transversal to the direction of movement and away from the mobile part 4. In the section plane illustrated in the accompanying figures from 1 to 9, the raised element 39 and the recess 40 are shaped to match each other and comprise an outer profile having the shape of an arc of a circle.

In addition, the uncoupling means comprise at least one thrust spring 41 (a flat spring in the accompanying drawings—not visible in FIGS. 11 and 12) which acts on the mobile element 38 pressing it against the mobile part 4 to keep the recess 40 coupled to the raised element 39. In fact, in this way, by suitably sizing it, the thrust spring 41 opposes the above-mentioned component of force only for as long at the force acting between the mobile element 38 and the mobile part 4 is less than the predetermined maximum force.

Figure 15:
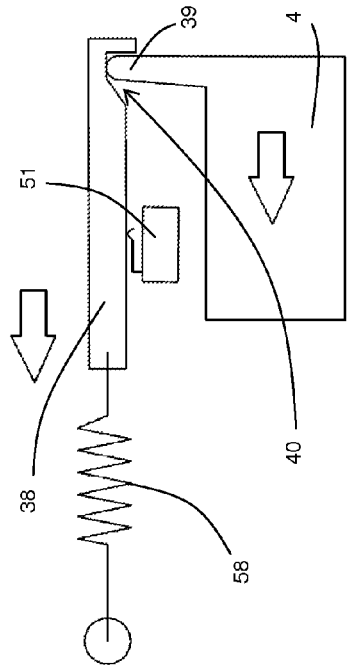
FIG. 15 is a schematic view of a first alternative embodiment of the detail of FIG. 11 in a normal operating condition.
Figure 16:
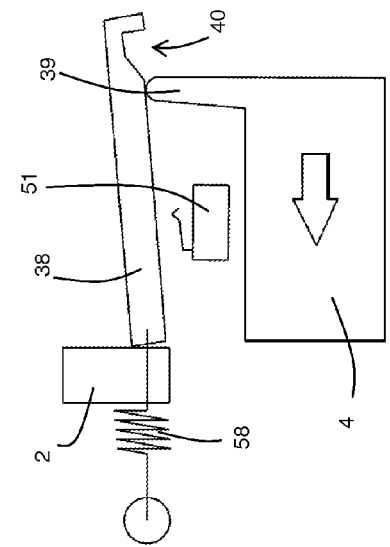
FIG. 16 illustrates the detail of FIG. 15 in a malfunctioning operating condition.
Figure 17:
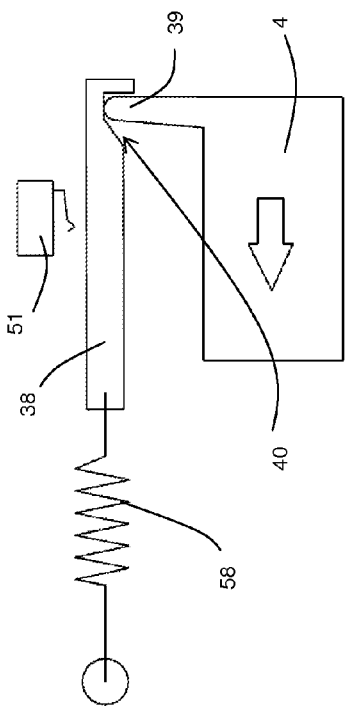
FIG. 17 is a schematic view of a second alternative embodiment of the detail of FIG. 11 in a normal operating condition.

In an alternative embodiment, the coupling between the mobile element 38 and the mobile part 4 may be obtained again by means of at least one raised element 39 and at least one recess 40 which is coupled to the raised element 39, the raised element and the recess being fixed one to the mobile part 4 and the other to the mobile element 38, but not shaped to match each other (FIGS. 15 to 18). In particular, in the latter case, the mobile part 4 may cause the movement of the mobile element 38 only during the passage from the operating position to the home position, overcoming the force applied by a closing spring 58 mounted in such a way as to return the mobile element 38 towards the respective first position; when in normal conditions the mobile part 4 returns to the operating position the mobile element 38 follows it under the effect of the force applied by the closing spring 58 (FIGS. 15 and 16). To obtain that effect and also allow uncoupling of the raised element 39 and the recess 40, they are advantageously shaped in such a way that a force applied by the mobile part 4 on the mobile element 38 in the direction of movement and towards the operating position (therefore usually during the unit closing step) generates a component of force on the mobile element 38 which is transversal to the direction of movement and away from the mobile part 4. In contrast, the raised element 39 and the recess 40 are advantageously shaped in such a way that when the force acts in the opposite direction, said component of force is substantially null. More particularly, in the embodiments illustrated in FIGS. 15 to 18, the raised element 39 and the recess 40 are advantageously shaped in such a way that they comprise a coupling by means of surfaces which are substantially perpendicular to the direction of movement on the side acting during the passage of the mobile part 4 towards the home position, and an angled plane coupling on the opposite side.

Returning to the first inventive aspect, thanks to the presence of the second standby zone 37 and the second retaining means 36, the check and control unit 35 is programmed at least to run a cycle for making two beverages consecutively. The choice of activating a cycle for consecutively making two beverages or a normal cycle for making just one beverage may advantageously be left to the operator, who will activate a specific control.

That programming comprises first, once a first cartridge 2 has been positioned in the first standby zone 8, bringing the mobile part 4 into the operating position so as to close the first cartridge 2 in the housing 9, and, at the same time or immediately afterwards, bringing the second retaining means 36 into the first position (obviously if they coincide with the mobile part 4 this passage occurs simultaneously). At this point the second retaining means 36 can receive and retain a second cartridge 2 in the second standby zone 37. At that point, the check and control unit 35 is programmed to activate water injection for a predetermined time so as to prepare a first beverage using the first cartridge 2. However, obviously, if the device 1 is made in such a way that it allows the insertion of both cartridges 2 before the unit is closed, at the moment of closing the mobile part 4 or in general, the second retaining means 36 are inserted between the two cartridges 2 separating them.

Once the first beverage has been made, the unit is programmed to bring the mobile part 4 into the home position again. During that movement the expulsion means expel the first cartridge 2 from the unit 3. Simultaneously with movement of the mobile part 4 (as in the embodiments illustrated) or immediately afterwards, the check and control unit 35 is programmed to bring the second retaining means 36 into the second position so that the second cartridge 2 can in turn reach the first standby zone 8 (obviously if the second retaining means 36 coincide with the mobile part 4 the movement occurs simultaneously).

At that point the check and control unit 35 again brings the mobile part 4 into the operating position to close the second cartridge 2 in the housing 9 and again activates water injection for a predetermined time to prepare a second beverage using the second cartridge 2.

In the preferred embodiment the check and control unit 35 is programmed to automatically close the unit as soon as the first cartridge 2 has been inserted. The reading of the second detection means 48 described below can be used for that purpose.

Figure 9:
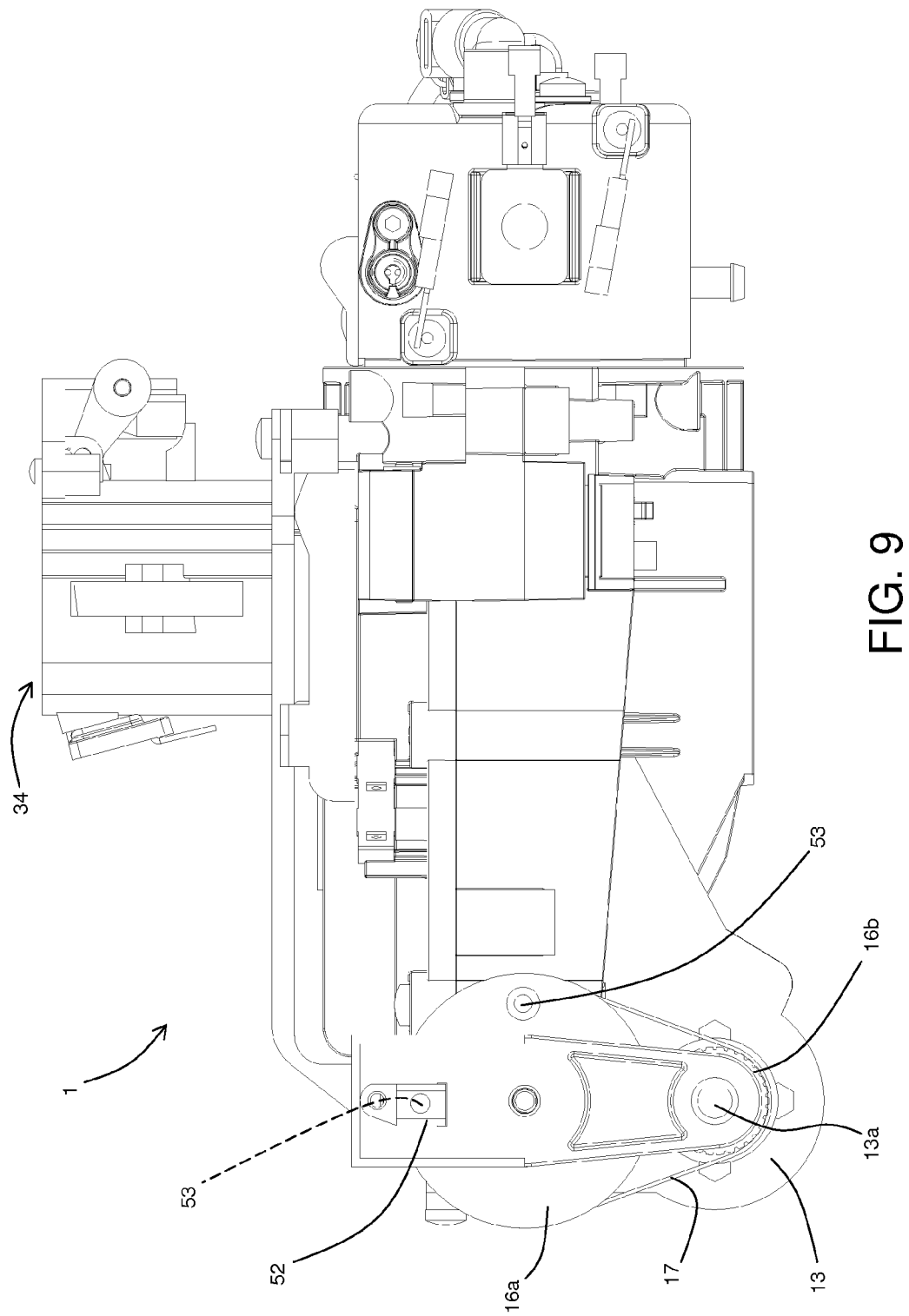
FIG. 9 is a rear view of the unit of FIG. 1.
Figure 10:
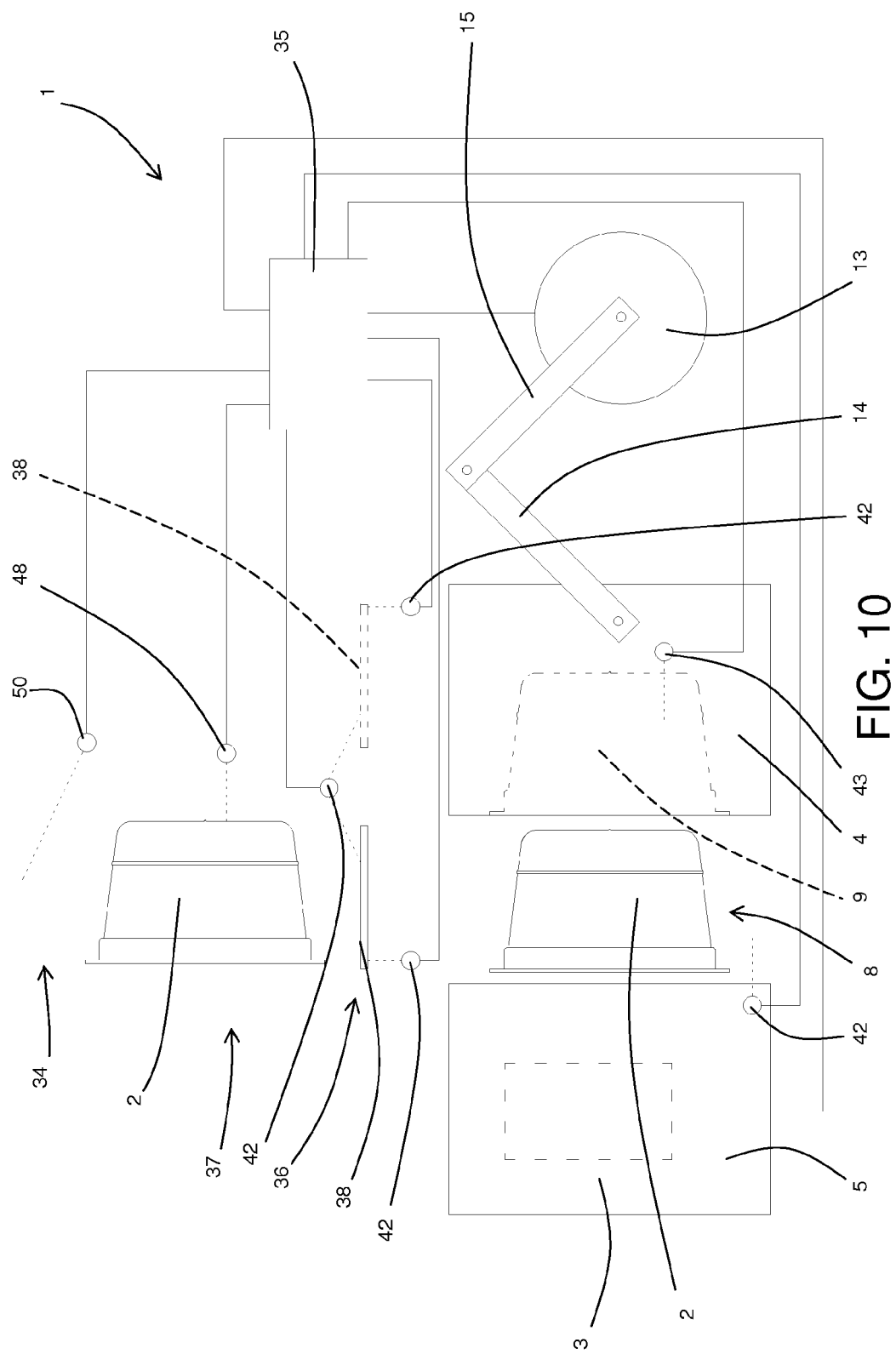
FIG. 10 is a diagram of the device of the preceding figures.

Advantageously, the device 1 also comprises safety means 42 for checking the correct positioning of the mobile part 4 in the operating and/or home position, and/or of the second retaining means 36 in the first and/or second position. The safety means 42 are operatively connected to the check and control unit 35 which is programmed to stop device 1 operation if the safety means 42 indicate to it incorrect positioning of the mobile part 4 and/or of the second retaining means 36. For example, the safety means 42 may comprise a plurality of end of stroke detectors, or a detector for coupling 51 between the mobile element 38 and the mobile part 4 as is schematically illustrated in FIGS. 11 and 12 and 15-18. The coupling detector 51 may also be mounted in such a way that it is in contact with the mobile element 38 either in the correct operating condition (FIGS. 11, 12, 17 and 18) or in the condition in which the mobile element 38 and the mobile part 4 are uncoupled (FIGS. 15 and 16). In contrast, as regards the positioning of the mobile part 4, the safety means may comprise a fixed Hall effect sensor 52, and two magnets 53 which are fixed to the first pulley 16a as shown in FIG. 9, being arranged in such a way as to couple to the Hall effect sensor 52 at the two angular positions adopted by the first pulley 16a when the mobile part 4 is in the operating position and in the home position.

With reference to a further embodiment of this invention, which may be implemented either together with the embodiment just described or independently of it, in the preferred embodiment the device 1 comprises first detection means 43 which are associated with the housing 9 to detect the presence of a cartridge 2 in it when the mobile part 4 is in the operating position.

The first detection means 43 are operatively connected to the check and control unit 35 for indicating to it the presence and/or the absence of a cartridge 2 in the housing 9, and the check and control unit 35 is programmed to control operation of the device 1 even depending on what is indicated by the first detection means 43.

In particular, the check and control unit 35 can be programmed to allow activation of water injection only when the first detection means 43 indicate the presence of a cartridge 2 in the housing 9, and/or to allow a new activation of water injection after a first activation, only following movement of the mobile part 4 from the operating position to the home position and then from the home position to the operating position. In fact, in this way, on one hand the supplying of water with no cartridge 2 present in avoided, and on the other hand the supplying of water again to a cartridge 2 that has already been used is avoided.

Similarly, the check and control unit can be programmed to not allow opening of the unit 3 when a cartridge that has still not be used is inside it (which would otherwise be expelled).

Figure 13:
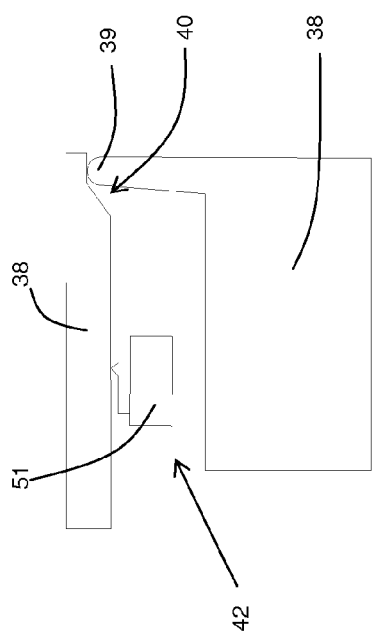
FIG. 13 is a schematic view of a second detail of the machine of FIGS. 1 to 10 in a first operating condition.
Figure 14:
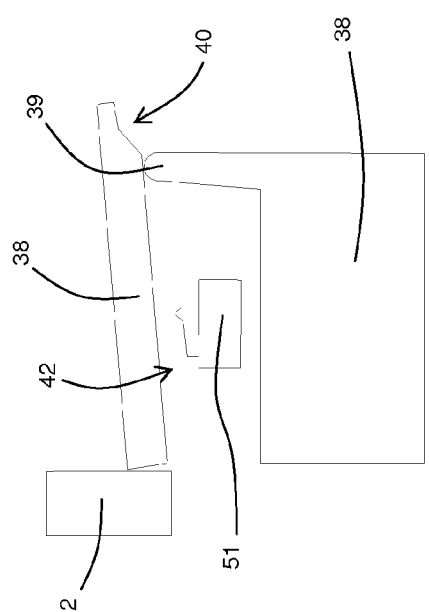
FIG. 14 shows the detail of FIG. 13 in a second operating condition.

In the embodiment illustrated, the first detection means 43 comprise a pin 44 inserted through the bottom of the housing 9 and opposed by a second return spring 45. Depending on the position adopted by the pin 44, a magnet 46 coupled to it (for example inserted in its enlarged central part in FIGS. 1 to 8) causes a different reading by a first electronic detector 47 (for example of the Reed effect or Hall effect type) connected to the check and control unit 35. Advantageously, the first detector 47 can be associated either with the mobile part 4 or, preferably (as illustrated in FIGS. 13 and 14), with a stationary part of the device 1.

In the embodiment described above, in which between the insertion section 34 and the first standby zone 8 there is a second standby zone 37, the device 1 may also comprise second detection means 48 associated with the second standby zone 37 for detecting the presence in it, or transit through it, of a cartridge 2. The second detection means 48 are operatively connected to the check and control unit 35 for indicating to it the presence and/or the absence, or respectively the transit, of a cartridge 2 in the second standby zone 37 or respectively through it. In turn, the check and control unit 35 can be programmed to control operation of the device 1 even depending on what is indicated by the second detection means 48. In particular, in the case in which the check and control unit 35 is programmed to perform the above-mentioned cycle for preparing two beverages, it may also be programmed to bring the mobile part 4 into the home position and the second retaining means 36 into the second position only if the second detection means 48 indicate in advance the presence of the second cartridge 2 in the second standby zone 37, or to close the unit as soon as they have indicated the transit of the first cartridge 2.

In the embodiment illustrated, the second detection means 48 comprise a second elastic return or gravity rotary unit 49 (aspects which are not illustrated in the accompanying drawings), which intercepts the movement path of the cartridge 2 from the insertion section 34 towards the second standby zone 37. Associated with the second rotary unit 49 there is a second electronic detector (not illustrated) which detects its rotation and which is operatively connected to the check and control unit 35.

According to a further embodiment of this invention, which may be applied independently of the first two described above, the device 1 may comprise at least one detection sensor 49, 50 combined with the insertion section 34 for detecting either something approaching it (a cartridge 2) from the outside of the unit 3 or the insertion of something (a cartridge 2) in it. The detection sensor 49, 50 is operatively connected to the check and control unit 35 for indicating to the latter the presence of something approaching or inserted in the insertion section 34, and the check and control unit 35 is in turn programmed to automatically move at least the mobile part 4 depending on what is indicated by the detection sensor 49, 50. In particular, in a first embodiment of this aspect of this invention, the check and control unit 35 is programmed to automatically bring at least the mobile part 4 into the home position when the latter is in the operating position and when the check and control unit 35 receives from the detection sensor 49, 50 a signal indicating the presence of something approaching or inserted in the insertion section 34. In addition, or alternatively, the check and control unit 35 may be programmed to automatically bring at least the mobile part 4 into the operating position when the latter is in the home position and after having received from the detection sensor 49, 50 a signal indicating the presence of something approaching or something inserted in the insertion section 34. In particular, the check and control unit 35 can be programmed to automatically bring at least the mobile part 4 into the operating position when it is in the home position, when a predetermined time has elapsed after receiving from the detection sensor 49, 50 the signal indicating the presence of something approaching or something inserted in the insertion section 34; said predetermined time may be selected in such a way as to allow the cartridge 2 to reach the first standby zone 8 before the mobile part is moved.

As already indicated, the two sets of programming for automatically moving at least the mobile part 4 may either be alternative or combined. If only one of the two sets of programming is used, the choice of one or the other will depend on what position the mobile part 4 must adopt when the device 1 is not being used (operating position or home position). In contrast, with combined use the device 1 starts from an initial condition with the mobile part 4 in the operating position; when the sensor 49, 50 sends the signal to the check and control unit 35 the latter issues the command first to move the mobile part 4 into the home position and then, when the predetermined time has elapsed, to return it to the operating position.

Then, the check and control unit 35 can issue the command for unit 3 opening and/or closing when the user's hand approaches with a new cartridge 2 to be inserted or when a cartridge 2 has been inserted in the device 1.

Advantageously, in a first embodiment, the detection sensor may be formed by the second rotary unit 49 described above or by other similar detection means, which can detect the presence or transit of a cartridge in the insertion section 34.

In contrast, in other embodiments, the detection sensor may be a sensor 50 able to determine the presence of something approaching the insertion section 34, for example a sensor which is sensitive to changes in lighting, such as a photodiode, a phototransistor or a photoresistor, or a sensor which is sensitive to movement, such as an infrared ray sensor (active or passive).

All of said embodiments may also be applied in the absence of a second standby zone 37.

If the check and control unit 35 is programmed to bring the mobile part 4 into the home position after the signal received from the detection sensor 49, 50, in the preferred embodiment the check and control unit 35 can also be programmed to reclose the unit 3 either based on what is indicated above or based on various variables.

In a first case, for example, it may be programmed to reclose the unit 3 either when the detection sensor 49, 50 indicates an away movement by what it previously detected as approaching, or automatically several seconds after opening.

Alternatively, if the second detection means 48 are used, the check and control unit 35 may be programmed to reclose the unit 3 when they have indicated the transit of a cartridge 2 through the insertion section 34 (or through the second standby zone 37 if present). However in this case, the check and control unit 35 will be programmed to also bring the second retaining means 36 into the second position when it receives from the detection sensor 49, 50 the signal indicating the presence of something approaching or something inserted in the insertion section 34.

Finally, advantageously, in the embodiment illustrated the check and control unit 35 is programmed in such a way that, when it receives from the detection sensor 49, 50 a signal indicating the presence of something approaching or inserted and when the mobile part 4 is in the operating position, it allows the passage of the mobile part 4 into the home position and if necessary of the second retaining means 36 to the second position, only when the housing 9 does not contain a cartridge 2 which has not yet been used.

This invention brings important advantages.

In particular, the embodiment to which the appended claims mainly refer allows both the avoidance of damage to the device caused by any cartridge jamming, and the prevention of injury if the user were to insert his fingers at the second retaining means.

Finally, it should be noticed that this invention is relatively easy to produce and that even the cost linked to implementing the invention is not very high.

The invention described above may be modified and adapted in several ways without thereby departing from the scope of the inventive concept.

Moreover, all details of the invention may be substituted with other technically equivalent elements and the materials used, as well as the shapes and dimensions of the various components, may vary according to requirements.

The invention claimed is:

1. An infusion device for making beverages using cartridges, such as capsules or pods, containing at least one food substance, comprising:
   an infusion unit including at least two parts, at least one part being a mobile part configured to move in a direction of a movement between a home position in which said mobile part is distanced from another part of said at least two parts, and an operating position in which said mobile part is coupled to said another part to form a housing for a cartridge, a first standby zone for the cartridge being formed when said mobile part is in the home position;
   a first retaining device for holding the cartridge in the first standby zone; a motor which is operatively connected at least to the mobile part for moving said mobile part between the operating position and the home position;
   a preparation device for preparing the beverage which is operatively associated with the housing, and configured for injecting water into the cartridge contained in said housing and for collecting the beverage prepared;
   at least one insertion section for inserting the cartridge in the device, from which the cartridge is then fed to the first standby zone;
   at least one check and control unit operatively connected to the motor for controlling the movement of the mobile part between the home position and the operating position, and operatively connected to the preparation device for activating and deactivating water injection;
   a second retaining device positioned between the insertion section and the first standby zone, the second retaining device configured to move between a first position to retain the cartridge at a second standby zone and a second position to avow the cartridge to advance towards the first standby zone, and
   a movement device for movement of the second retaining device between said first and second positions;
   wherein the second retaining device is configured to move as one with the mobile part of the infusion unit at least during normal operation, and is in the first position when the mobile part is in the operating position, and in the second position when the mobile part is in the home position; and
   further wherein the second retaining device includes at least one mobile element removably coupled to the mobile part of the infusion unit, and an uncoupling device for uncoupling the mobile element from the mobile part when, during movement of the mobile part, the mobile element opposes said movement with a force which is greater than a predetermined maximum force.

2. The device according to claim 1, wherein the mobile element and the mobile part include at least one raised element and at least one recess which is coupled to the raised element, the recess and/or the raised element extending transverse to the direction of movement and both being shaped in such a way that a force applied by the mobile part on the mobile element in the direction of movement, at least during movement of the mobile part towards the operating position, generates a component of force on the mobile element which is transverse to the direction of movement and away from the mobile part.

3. The device according to claim 1, wherein the movement device further includes a closing spring connected to the mobile element for returning said mobile element towards the respective first position in the absence of external stresses and for causing the mobile element to return towards the first position when the mobile part moves towards the operating position, the movement of the mobile element towards the second position being caused by the mobile part when said mobile part moves towards the home position.

4. The device according to claim 1, wherein the check and control unit is operatively connected to the movement device for moving the second retaining device between said two positions.

5. The device according to claim 1, wherein the first standby zone is formed either between the two parts of the unit or by one of said parts of the unit.

6. The device according to claim 1, wherein the check and control unit is programmed to allow a new activation of water injection after a first activation only following movement of the mobile part from the operating position to the home position and then from the home position to the operating position.

7. The device according to claim 1, further comprising a second detection device associated with the second standby zone for detecting the presence in, or transit through, said second standby zone of the cartridge, and operatively connected to the check and control unit for indicating to said check and control unit the presence and/or the absence of the cartridge in the second standby zone, or respectively the cartridge in transit through the second standby zone, the check and control unit being programmed to control operation of the device depending on what is indicated by the second detection device.

8. The device according to claim 1, wherein the device further comprises a second detection device which is associated with the second standby zone for detecting the presence in it, or transit through, said second standby zone of the cartridge, and operatively connected to the check and control unit for indicating to said check and control unit the presence and/or the absence of the cartridge in the second standby zone, or respectively the cartridge in transit through the second standby zone, the check and control unit being programmed to control operation of the device depending on what is indicated by the second detection device, and in that during the cycle for making two beverages the check and control unit is programmed to bring the mobile part into the home position and the second retaining device into the second position only if the second detection device indicates in advance the presence of a second cartridge in the second standby zone or, respectively, the cartridge in transit through the second standby zone.

9. The device according to claim 1, further comprising a safety device for checking the correct positioning of the mobile part in the operating and/or home position, and/or of the second retaining device in the first and/or second position, the safety device being operatively connected to the check and control unit, said check and control unit programmed to stop device operation if the safety device indicates an incorrect positioning of the mobile part and/or of the second retaining device.

10. The device according to claim 2, wherein the uncoupling device includes at least one thrust spring which acts on the mobile element, opposing said component of force so as to press the mobile element against the mobile part and keep the recess coupled to the raised element, only for as long as the force acting between the mobile element and the mobile part is less than said predetermined maximum force.

11. The device according to claim 2, wherein the movement device further includes a dosing spring connected to the mobile element for returning said mobile element towards the respective first position in the absence of external stresses and for causing the mobile element to return towards the first position when the mobile part moves towards the operating position, the movement of the mobile element towards the second position being caused by the mobile part when said mobile part moves towards the home position.

12. The device according to claim 2, wherein the check and control unit is operatively connected to the movement device for moving the second retaining device between said two positions.

13. The device according to claim 2, wherein the first standby zone is formed either between said at least two parts of the unit or by one of said at least two parts of the unit.

14. The device according to claim 3, wherein the check and control unit is operatively connected to the movement device for moving the second retaining device between said two positions.

15. The device according to claim 4, wherein the first standby zone is formed either between said at least two parts of the unit or by one of said at least two parts of the unit.

16. The device according to claim 5, wherein the first standby zone is formed either between said at least two parts of the unit or by one of said at least two parts of the unit.

17. The device according to claim 10, wherein the movement device further includes a dosing spring connected to the mobile element for returning said mobile element towards the respective first position in the absence of external stresses and for causing the mobile element to return towards the first position when the mobile part moves towards the operating position, the movement of the mobile element towards the second position being caused by the mobile part when said mobile part moves towards the home position.

18. The device according to claim 10, wherein the check and control unit is operatively connected to the movement device for moving the second retaining device between said two positions.

19. The device according to claim 10, wherein the first standby zone is formed either between said at least two parts of the unit or by one of said at least two parts of the unit.

* * * * *